United States Patent [19]

Cherault

[11] 4,247,587
[45] Jan. 27, 1981

[54] FLOOR COVERING

[75] Inventor: Michel Cherault, Garges-Les Gonesse, France

[73] Assignee: Regie Nationale des Usines Renault, Boulogne-Billancourt, France

[21] Appl. No.: 2,409

[22] Filed: Jan. 10, 1979

[30] Foreign Application Priority Data

Jan. 10, 1978 [FR] France .............................. 78 00489

[51] Int. Cl.³ .................. C25D 13/00; D06N 7/04
[52] U.S. Cl. ............................ 428/155; 204/181 T; 427/57; 427/257; 427/379; 427/388.5; 427/421; 428/457; 428/522
[58] Field of Search ............... 427/57, 409, 407 R, 427/424, 257, 379, 388.5, 421; 204/181 C, 181 T; 428/155, 457, 522

[56] References Cited

U.S. PATENT DOCUMENTS

| 2,891,876 | 6/1959 | Brown et al. | 427/409 X |
| 3,785,855 | 1/1974 | Sausaman et al. | 427/409 X |
| 4,046,729 | 9/1977 | Scriven et al. | 204/181 C |
| 4,076,675 | 2/1978 | Sommerfeld | 204/181 C |
| 4,119,743 | 10/1978 | Lu | 427/409 X |
| 4,137,140 | 1/1979 | Belanger | 204/181 C |
| 4,139,510 | 2/1979 | Anderson | 204/181 C |

Primary Examiner—Bernard D. Pianalto
Attorney, Agent, or Firm—Oblon, Fisher, Spivak, McClelland & Maier

[57] ABSTRACT

A process for providing a plastisol covering on a metal surface so as to form in situ a floor covering in the passenger space of an automotive vehicle including dispersing polyvinyl chloride powder in a liquid solvent of an ester type virtually uncharged so as to form the plastisol and spraying the plastisol by means of a spray gun on the floor of the vehicle at the time of its passage into a painting conveyor. The corresponding product of such process is also disclosed.

8 Claims, 2 Drawing Figures

FLOOR COVERING

BACKGROUND OF THE INVENTION

1. Field of the Invention

The present invention involves the constitution of a floor covering in situ, particularly within the passenger space of an automotive vehicle, making it possible to eliminate the customary floor carpeting, along with a certain number of supplemental operations.

2. Description of the Prior Art

The use of traditional-style rubber of polyvinyl floor coverings carries with it a certain number of restraints and supplemental operations.

With regard to the coverings themselves, aside from their manufacture per se, provision must be made for storage areas, means of transportation (very often involving trans-shipment), packaging, cutting to the proper shape, and so forth.

Furthermore, special care is required in preparing the surfaces on which the coverings are to be laid, e.g., placing strips of sealing compound at the spot-welded seams of the various metal plates joined in order to assure the proper degree of imperviousness of the passenger space, plugging the various openings provided, especially for draining off paint, by capping the corresponding orifices, attaching clasps between the plates and the rubber coverings for possible subsequent soundproofing, and the actual laying of the covering itself, which may be difficult if the surface is uneven.

SUMMARY OF THE INVENTION

The object of the present invention is to simplify drastically the constitution of the aforementioned type of floor covering by eliminating these numerous operations and replacing them by a quick and inexpensive treatment of the surface to be covered.

One of the basic characteristics of the process according to the invention is that said surfaces, arriving from the painting conveyor, are sprayed with a liquid PVC composition which solidifies during the phase of which the paint previously deposited on the vehicle body is fired.

Another characteristic of the invention is in the constitution, on the covering, of decorative or reinforced zones, such as floor mats found where the driver and the passenger in the front seat place their feet.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

The process of the invention is a two-stage operation.

In the initial stage, when the object to be covered crosses the painting conveyor, a spray-gun is used to project a product which simultaneously seals the metal plate welds, serves partially as a soundproofing agent and constitutes a floor covering.

A product such as this is of the plastisol type, i.e., obtained from the dispersion of a powdered polyvinyl chloride in a liquid phase such as an ester. Such plastisol, which has a minimum gelling temperature of approximately 140°–150° C., is virtually uncharged and includes a bonding resin. It resists wear and tear, scratches and abrasion particularly well.

An especially effective type of product is, for example, the plastisol marketed under the name of REVSOL IDC 96, reference 8.839.

The aforementioned product is projected onto the floor of the vehicle, the sub-frame and the forward foot-well, after the vehicle body has been given its preparatory coating by electrophoresis or by solvent-hardening and then been fired. The thickness of the covering of the invention is approximately 1 to 2 mm and its appearance is crackled. This affect is obtained through the selection of the spray-gun nozzle and the gas pressure employed.

Such covering can be pigmented en masse or else coated with a layer of surface paint on the painting conveyor. Firing occurs in a drying oven, making use of the drying stage for the primer previously applied on the outside surface of the vehicle body, for 30 minutes at a temperature of 155° to 170° C.

The process of the invention includes a second stage, the purpose of which is to impart a decorative appearance to the aforementioned surface. In particular, this stage involves the surface located under the pedals, which had been covered beforehand with a rubber pad.

With the process of the invention, it is still possible to glue on a pad made of material resisting a temperature of 170° C., to which the covering is subjected while being fired. It is also possible, however, to use a different process, one which involves a local marking. This can be obtained by cold treatment using a relatively heavy non-sticking cast, perhaps made of TEFLON, of the proper shape, which is deposited in the desired location on the still-liquid covering and which is withdrawn after the latter has been fired in the oven.

The marking can also be obtained by heat treatment through local application of a properly shaped heating tool, after the floor covering has been fired. The design on the tool is thus transfered to the covering after heating to a temperature over 140° C. under sufficient pressure.

This operation can be performed in similar manner, after drying the covering, with a properly shaped tool, particularly in combination with the use of ultrasonic or high-frequency waves, smoothing the surface of the covering.

Figure 1:
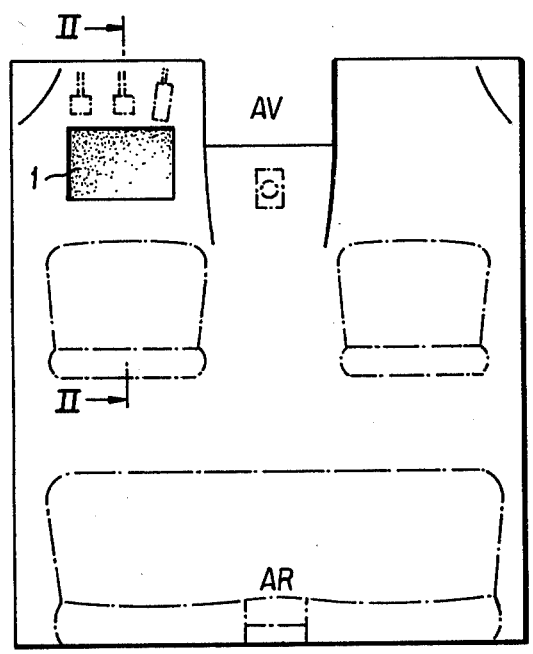
FIG. 1 is a top view of the inside of a passenger vehicle treated according to the invention.
Figure 2:
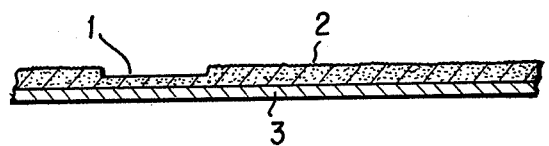
FIG. 2 is a partial vertical cross-section along line II—II of FIG. 1.

FIG. 1 is a good illustration of a zone arranged in this way while FIG. 2 shows casting 1 previously obtained by the aforementioned method of local compression of covering 2, which also evenly covers the underlying plate 3 on the floor of the vehicle.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for providing a plastisol covering on a metal surface so as to form, in situ, a floor covering in the passenger space of an automotive vehicle comprises:
   dispersing polyvinyl chloride powder in a liquid solvent of an ester type, virtually uncharged, so as to form said plastisol;
   applying a priming coating by electrophroesis and firing said floor;
   spraying said plastisol by means of a spray-gun on the floor of the vehicle at the time of its passage into a painting conveyor to form said covering,
   imparting a crackled appearance to said covering as a function of the choice of spray nozzle and gas pressure employed during spraying, and
   baking said covering at a temperature of 155° to 170° C. for approximately 30 minutes.

2. A floor covering made by the process of claim 1.

3. The process for providing a foor covering according to claim 1, said spraying including spraying plastisol to a thickness of about 1 to 2 mm so as to ensure imperviousness of plate welds in the floor and the partial soundproofing thereof.

4. The process for providing a floor covering according to claim 1 which further comprises; arranging decorative zones on the surface of the covering.

5. The process for providing a covering according to claim 4 wherein said arranging of zones comprises impressing a design, made from a material which can resist temperatures up to 170° C., on the surface of the covering while in a liquid form and placing the covering in a tunnel used for drying the design and drying the design.

6. The process for providing a floor covering according to claim 4 which further comprises;
   locally applying a non-adhesive cast on the covering while in a liquid form and withdrawing the cast upon exiting of the covering from a drying tunnel.

7. The process for providing a floor covering according to claim 4 which further comprises;
   applying locally and under pressure on the surface of the covering a corresponding cast heated to a temperature in excess of 140° C. by use of ultrasonic waves.

8. The process for providing a floor covering according to claim 4 which further comprises applying locally and under pressure on the surface of the covering a corresponding cast heated to a temperature in excess of 140° by high-frequency waves.

* * * * *